(12) United States Patent
Soulie et al.

(10) Patent No.: US 8,539,084 B2
(45) Date of Patent: Sep. 17, 2013

(54) ESTABLISHMENT OF A PACKET COMMUNICATION BETWEEN A SERVER AND A SERVICE ENTITY OF A RADIOCOMMUNICATION NETWORK

(75) Inventors: Antoine Soulie, Paris (FR); Francis Pinault, Courbevoie (FR)

(73) Assignee: Alcatel Lucent, Paris (FR)

( * ) Notice: Subject to any disclaimer, the term of this patent is extended or adjusted under 35 U.S.C. 154(b) by 86 days.

(21) Appl. No.: 12/867,017

(22) PCT Filed: Feb. 4, 2009
(Under 37 CFR 1.47)

(86) PCT No.: PCT/FR2009/050167
§ 371 (c)(1),
(2), (4) Date: Feb. 28, 2011

(87) PCT Pub. No.: WO2009/103915
PCT Pub. Date: Aug. 27, 2009

(65) Prior Publication Data
US 2011/0173335 A1    Jul. 14, 2011

(30) Foreign Application Priority Data
Feb. 21, 2008 (FR) ...................... 08 51121

(51) Int. Cl.
*G06F 15/16* (2006.01)

(52) U.S. Cl.
USPC ........... 709/227; 709/228; 370/352; 455/410; 455/411; 717/168; 717/170

(58) Field of Classification Search
USPC ......................................... 709/228
See application file for complete search history.

(56) References Cited

U.S. PATENT DOCUMENTS 6,636,502 B1 * 10/2003 Lager et al. ................. 370/352
6,957,060 B1 * 10/2005 Sharp .......................... 455/410
2007/0143613 A1    6/2007 Sitch et al.

FOREIGN PATENT DOCUMENTS
WO    WO 2006/079298 A    8/2006

* cited by examiner

*Primary Examiner* — Tonia L Dollinger
*Assistant Examiner* — Adam Cooney
(74) *Attorney, Agent, or Firm* — Fay Sharpe LLP

(57) ABSTRACT

In order to establish a packet communication between a first server (SS) connected to a packet network (RP) and a service entity (ES) capable of communicating without a subscriber identification module in a radiocommunication network (RR), the service entity transmits an identifier (IdEs) of the service entity (ES) to a second server (SO) that determines an address (Ads) of the first server based on the received service entity identifier. The second server transmits the determined address of the first server to a gateway that interconnects the radiocommunication network and the packet network. The gateway establishes a communication between the service entity and the first server based on the address of the first server.

13 Claims, 3 Drawing Sheets

ESTABLISHMENT OF A PACKET COMMUNICATION BETWEEN A SERVER AND A SERVICE ENTITY OF A RADIOCOMMUNICATION NETWORK

The present invention concerns the establishment of packet communication between a server comprised within a packet network dispensing a digital service and a service entity including an equipment communicating within a radio communication network, the service entity containing no subscriber identification module, for example a chip card.

Currently, a communicating device such as a mobile terminal may send and receive data by means of a radio communication network if it is equipped with a subscriber identification module issued by the radio communication network's operator. For example, this module is a SIM card (for "Subscriber Identification Module") comprising information on the user of the mobile terminal, which enables him or her to be identified by the network, and afterward, to be authorized to send and receive data over the network. In particular, a mobile terminal must be equipped with a SIM card to access a multimedia service via the radio communication network by transmitting data packets.

Many companies have a fleet of mobile terminals used by employees for professional purposes. Generally, each of the mobile terminals is equipped with a SIM card associated with the mobile terminal's user. For each mobile terminal, the billing of communications that are made is specific to the user of the mobile terminal. Furthermore, some companies possess service entities, such as motor vehicles or beverage vending machines, equipped with communicating equipment. Such a company's communicating equipment may connect by means of a SIM card to a server managed by the company via a radio communication network, such as to inform the company of the latest events occurring, such as an incident affecting a motor vehicle or the need to be supplied with a sort of beverage for a beverage vending machine.

The management of SIM cards associated with the communicating equipment of such companies is complex and causes these companies to incur high costs, or forms an obstacle to some companies when investing in communicating equipment.

There is therefore a need for companies to have communicating equipment which do not contain SIM cards, particularly for centralizing the billing of packet communications regarding a single company's communicating equipment.

The patent FR 2794917 describes a simplified mobile telephone that does not include a reader for receiving a subscriber identification module. The simplified mobile terminal is authorized to access a public radio communication network for receiving or sending calls, i.e. to communicate with another mobile telephone via a communication channel devoted to voice transmission in connected mode.

One goal of the invention is to remedy the previous drawbacks by establishing packet communication between a server and a communicating equipment containing no subscriber identification module.

In order to achieve this goal, a method according to the invention for establishing packet communication between a first server connected to a packet network and a service entity capable of communicating, without a subscriber identification module, within a radio communication network, is characterized in that it comprises the following steps:
a transmission of an identifier of the service entity from that service entity to a second server,
a determination of an address of the first server based on the service entity identifier received in the second server, and a transmission of the first server's determined address from the second server to a gateway connecting the radio communication network and the packet network, and
an establishment by the gateway of communication between the service entity and the first server depending on the address of the first determined server.

Advantageously, the invention makes it possible to establish a packet communication between a server and an equipment communicating by means of information on the service entity including the communicating equipment, without using the subscriber identification module. A company may thereby subscribe to a single subscription for the packet communications made by all of the communicating equipment regarding the company, which reduces the costs of managing this communicating equipment.

According to another characteristic of the invention, the first server's address may be determined if the service entity identifier is included in the lookup table associated with the first server's address. The lookup table may be managed by the radio communication network's operator and updated based on information provided by a company regarding the communicating equipment and the first server under the company's control.

In another characteristic of the invention, the method may further comprise a transmission of a communication equipment's identifier from the service entity to the second server, the communicating equipment being included in the service entity and capable of communicating with the radio communication network, and the first server's address may be determined if the service entity's identifier and the communicating equipment's identifier are included in a lookup table associated with the first server's address.

Advantageously, the first server's address may be determined based on unique information specific to the communicating equipment and the service entity, such as serial numbers.

In a first embodiment of the invention, the method may further comprise:
transmitting a first request from the service entity to the gateway,
after the first request is received, transmitting a second request from the gateway to the service entity, and
after the second request is received, transmitting a response containing the service entity's identifier and an address of the second server from the service entity to the gateway, which retransmits these identifiers to the second server based on the second server's address.

In a second embodiment of the invention, the method may further comprise:
a call from the service entity to a call server connected to the radio communication network
after a call is received, transmitting a request from the call server to the service entity, and
after the request is received, transmitting a response containing the service entity's identifier and an address of the second server from the service entity to the call server, which retransmits these identifiers to the second server based on the second server's address.

According to another characteristic regarding the second embodiment of the invention, the method may further comprise:
a transmission of the first server's determined address from the second server to the call server,
a determination of a temporary identity of the service entity within the call server and a transmission of the temporary identity and determined address from the call server to the service entity, and a transmission of the temporary identity and determined address from the service entity to the gateway.

The communicating equipment's identifier may be representative of a serial number of the communicating equipment.

The invention also concerns a service entity for establishing packet communication between a first server connected to a packet network and the service entity, this service entity being capable of communicating without a subscriber identification module within a radio communication network, characterized in that it comprises means for transmitting an identifier of the service entity from that service entity to a second server, so that the second server can determine an address of the first server depending on the service entity's received identifier and transmit the first server's determined address to a gateway which connects the radio communication network and the packet network and which establishes communication between the service entity and the first server depending on the first server's determined address.

The invention further concerns a gateway connecting a radio communication network and a packet network for establishing packet communication between a first server connected to the packet network and a service entity capable of communicating without a subscriber identification module within the radio communication network, characterized in that it comprises:
means for transmitting a request to the service entity following the receipt of another request transmitted from the service entity,
means for receiving a response containing an identifier of the service entity and an address of a second server from the service entity and for retransmitting these identifiers to the second server depending on the second server's address, and
means for establishing a communication between the service entity and the first server depending on the first server's address transmitted by the second server and determined by it depending on the service entity's identifier.

The invention further concerns a server for establishing packet communication between a first server connected to a packet network and a service entity capable of communicating without a subscriber identification module within a radio communication network, characterized in that it comprises:
means for receiving an identifier of the service entity from the service entity,
means for determining an address of the first server depending on the service entity's received identifier and transmitting the first server's determined address to a gateway connecting the radio communication network and the packet network, in order for the gateway to establish a communication between the service entity and the first server depending an the first server's determined address, The present invention and the benefits thereof shall be better understood upon examining the description below, which makes reference to the attached figures, in which:

Figure 1:
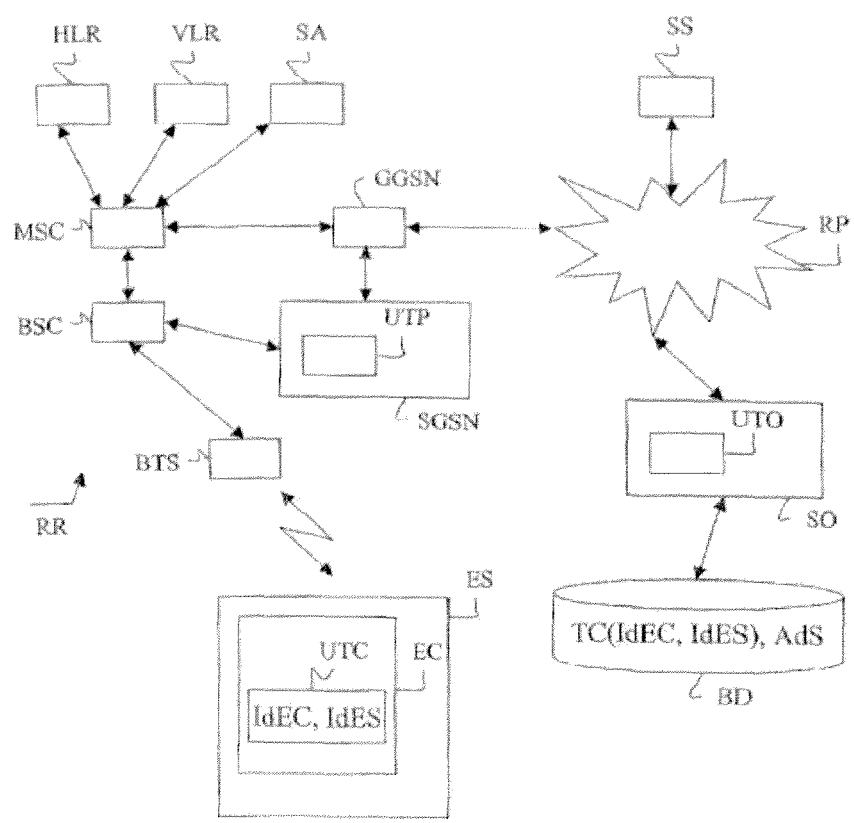
FIG. 1 is a schematic block diagram of a communication system for establishing second communication between a server and a service entity according to the invention.

With reference to FIG. 1, a communication system according to the invention comprises a radio communication network RR, a packet network RP, an operator server SO connected to or included within the packet network RP, and a communicating equipment EC which is capable of operating within the network RR without a subscriber identification module and which is included within a service entity ES.

For example, the radio communication network RR is a GSM (Global System for Mobile communications) or UMTS (Universal Mobile Telecommunications System) digital cellular radio communication network. The GSM network may be coupled with a GPRS (General Packet Radio Service) network for the transmission of data by packets with mobility and access management via radio. The packet network RP is a high-speed IP network, such as the Internet. By way of example, the radio communication network RR is capable of allowing a communicating equipment, such as a mobile terminal, to send and receive data over the network RR whenever the communicating equipment's user is identified with the network by means of a subscriber identification module associated with the communicating equipment.

FIG. 1 depicts components of the localization area of the GSM network RR where the communicating equipment is situated. The location area comprises an MSC (Mobile service Switching Center) which is connected by means of a BSC (Base Station Controller) to a base station BTS (Base Transceiver Station) connected by means of a radio link to the mobile terminal EC.

The network RR comprises a nominal location register HLR (Home Location Register) and one or more VLR (Visitor Location Register) location registers connected to the switch MSC. The HLR register is similar to a database containing an international identity IMSI (International Mobile Subscriber Identity) associated with a subscription profile for each user in the network RR. The register VLR is a relay of the register HLR and contains characteristics of the users located in the location area to manage their mobility.

Within the GSM/GPRS network RR, the base station controller BSC and switch MSC are respectively connected to a service node SGSN (Serving GPRS Support Node) and a gateway-node GGSN (Gateway GPRS Support Node). According to the invention, the operator's server SO may be directly or indirectly connected to the gateway node GGSN via a packet communication network, for example the Internet. All of the SGSN and GGSN nodes constitute a gateway connecting the radio communication network RR and the packet network RP. The service node SGSN comprises a processing unit UTP for communicating with servers of the packet network RP and with entities of the radio communication network RR.

The switch MSC may be connected to a call server SA devoted to emergency calls. The call server SA processes emergency calls, such as a call corresponding to the number 112, which may be dialed from any land-line or mobile terminal operating with or without a subscriber identification module.

The communicating equipment EC is included within a service entity ES which belongs to a company. Such a company may possess one or more service entities each equipped with at least one communicating equipment. By way of example, the service entity ES may be a motor vehicle belonging to a taxi company, or an automatic counter of a particular energy, such as water, gas, or electricity belonging to a company in the energy sector, or a beverage vending machine belonging to a company specializing in food vending. The service entity is therefore a land-line or mobile device that can communicate with the radio communication network RR by means of the communicating equipment, The communicating equipment EC, and consequently the service entity ES, is capable of operating within the radio communication network RR without using the subscriber identification module, unlike with a conventional mobile telephone which contains a card reader into which a subscriber identification module specific to the user is inserted. In particular, the communicating equipment EC comprises a radio interface and a processing unit UTC containing a processor and memories in which are stored all of the radio parameters needed for the operation of the communicating equipment EC. The processing unit UTC particularly contains an identifier IdES of the service entity and an identifier IdEC of the communicating equipment. According to the invention, the communicating equipment may contain a subscriber identification module, but does not use this module for communicating with the radio communication network RR.

The operator's server SO is comprised within the GPRS network of the radio communication network RR, meaning that it is connected to or included within the packet network RP, and is capable of authenticating the communicating equipment EC requesting the establishment of packet communication with a service server SS.

A service server SS is managed by the company that possesses the service entity(-ies) ES. The packet network RP includes at least one service server SS that may offer one or more digital services accessible from the communicating equipment EC. A digital service may be a service providing multimedia documents, such as digital files comprising text and/or sound and/or image, for example, in order to update digital data managed by the service entity ES, such as the prices of services offered by the service entity. Furthermore, the service server SS may administer a database containing information about each of the service entities belonging to the company managing the server SS. For example, the service entity ES informs the service server SS of the latest changes produced, such as the motor vehicle's distance traveled or the number of beverages remaining in the beverage vending machine.

The operator server SO is linked to a database BD, which is integrated into that server SO or incorporated into a database management server linked to the server SO by a local or remote link. The database BD comprises information about the invention, such as the lookup tables TC comprising service entity identifiers IdES respectively associated with communicating equipment identifiers IdEC. Each lookup table TC is associated with an address AdS of a service server SS, such as an IP address. Each lookup table TC may further be associated with an identifier of the company managing a fleet of service entities whose respective identifications are included in the table TC. The operator server SO comprises a processing unit UTO for communicating with the packet network RP and for analyzing the database BD.

In one variant, the operator server SO and the service server SS are combined into, or integrated within, a single server which is in relation with or which includes the database BD.

According to the invention, a server within the packet network RP may reference the communications established between the communicating equipment EC and a service server SS for establishing a billing of the services used by the communicating equipment EC.

Figure 2:
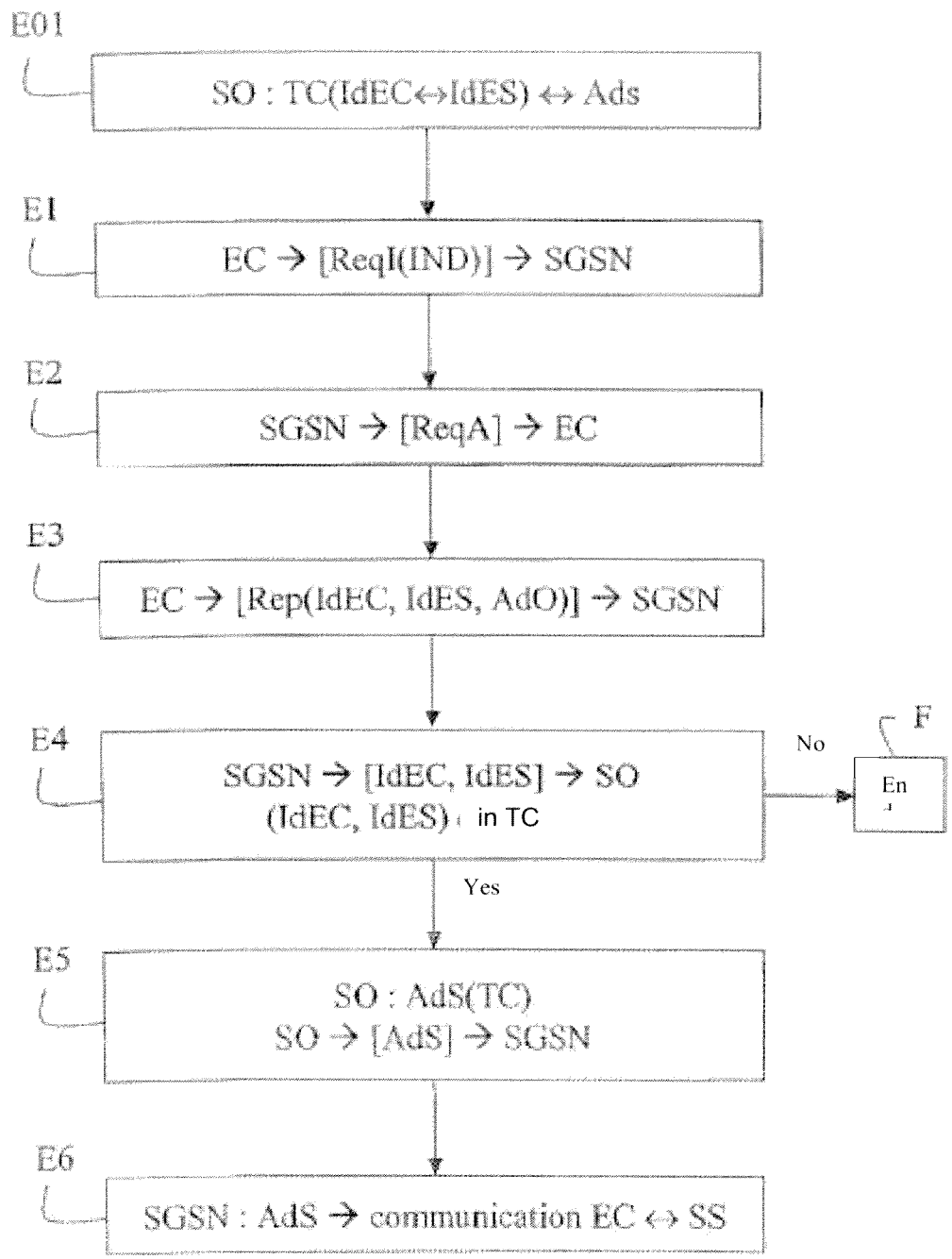
FIG. 2 is an algorithm of a method for establishing a packet communication between a server and a service entity according to a first embodiment of the invention.
Figure 3:
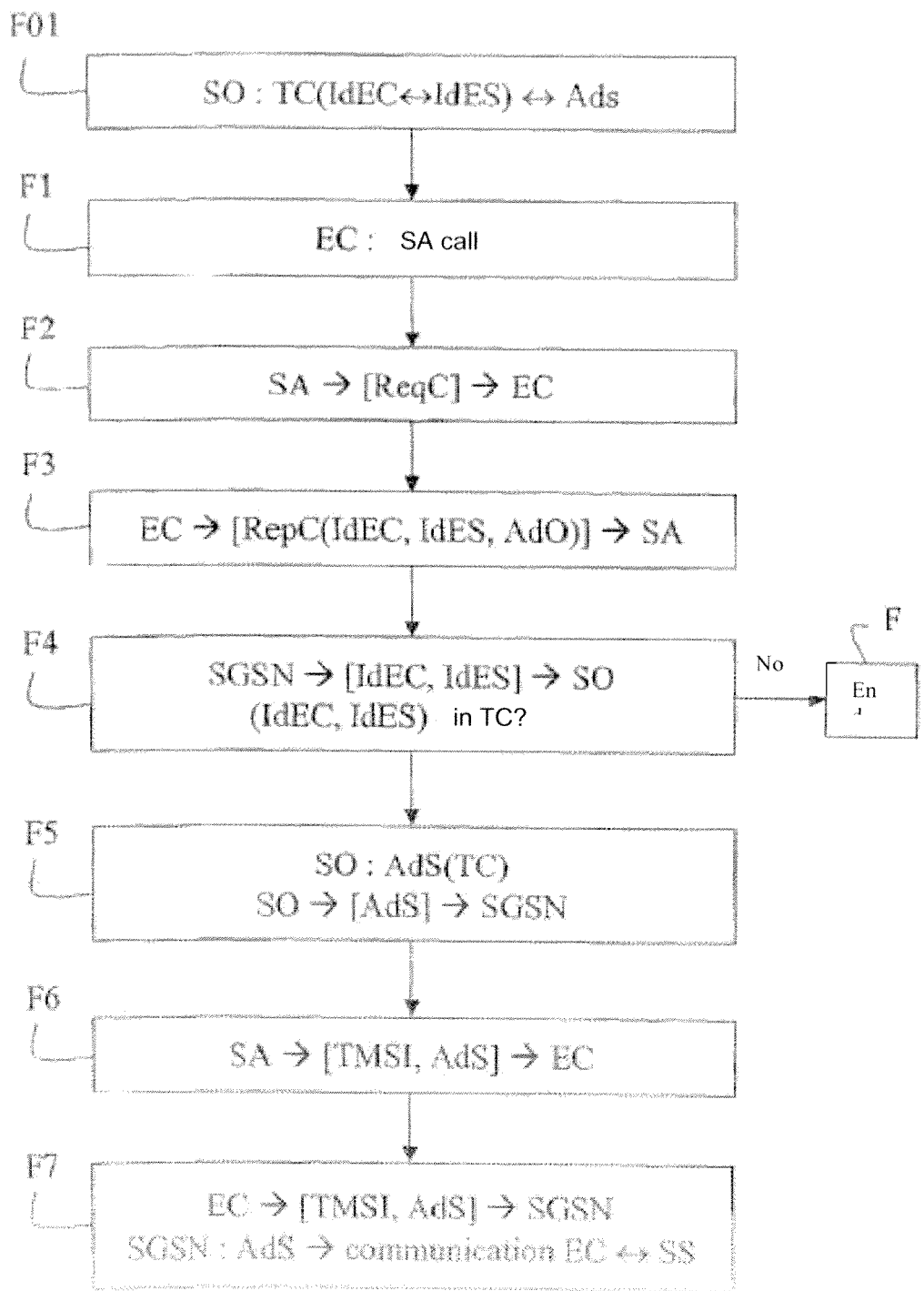
FIG. 3 is a schematic algorithm of a method for establishing a packet communication between a server and a service entity according to a second embodiment of the invention.

According to a first embodiment with reference to FIG. 2, the inventive method for establishing packet communication comprises steps E1 to E6, executed automatically within the inventive communication system, In a preliminary step E01, the operator server SO predefines lookup tables TC which each comprise service entity identifiers IdES respectively associated with communicating equipment identifiers IdEC and which are respectively associated with addresses AdS of service servers SS. For example, a communicating equipment identifier IdEC is an international mobile equipment identity IMEI (International Mobile Equipment identity) representative of a serial number specific to the communicating equipment, and a service entity identifier IdES is representative of the serial number specific to the service entity, such as the motor vehicle's license plate number, In step E1, the communicating equipment EC transmits an initialization request ReqI to the service node SGSN in order to be assigned to the GIDRS network. The request ReqI is transmitted from the communicating equipment EC to the service node SGSN successively via the base station BTS, the base station controller BSC and the mobile service switch MSC, The transmission of the request ReqI triggers a procedure called "GPRS Attach" which makes it possible to establish a logic link between the communicating equipment EC and the node SGSN and to activate a PDP context (Packet Data Network) to send and receive data from the communicating equipment EC. A PDP context is a set of information describing a multimedia service and comprising parameters for communicating with a service server, using a specific protocol, such as the IP or X.25 is protocol, and with a determined quality of service. An activation procedure called "PDP Context Activation" enables the communicating equipment EC to be known to the node-gateway GGSN which connects the radio communication network RR serving the communicating equipment EC with the packet network RP comprising the service server SS.

The request ReqI contains a service indicator IND that may be interpreted by the service node SGSN to trigger a procedure similar to an emergency call procedure.

In step E2, the service node SGSN receives the request ReqI and reads the service indicator IND contained within the received request. The service mode SGSN interprets the indicator IND as a PDP context activation command without using the international identity IMSI. The node SGSN then transmits an activation request ReqA to the communicating equipment EC.

In step E3, in response to receiving the activation request ReqA, the communicating equipment EC transmits a response Rep to the service node SGSN containing a service entity identifier IdES, a communicating equipment identifier IdEC and an address AdO of the operator server SO. The address AdO is, for example, an IP address of the server SS.

In step E4, the service node SGSN queries the operator server SO by means of the received address AdO of the operator server SO to authenticate the communicating equipment EC. To that end, the service node SGSN retransmits the service entity identifier IdES and the communicating equipment identifier IdEC to the operator server SO, which looks for them in the lookup tables TC of the database BD.

If the pair made up by the service entity identifier IdES and the communicating equipment identifier IdEC is included within a table TC, the operator server SO determines, in step E5, the address AdS of a service server associated with the located table TC and transmits the address AdS to the service node SGSN, informing that node that the communicating equipment EC is authenticated. If the aforementioned pair is not included in a table TC, the service node SGSN refuses access to the service requested by the communicating equipment, which is not authenticated, and the methods ends as indicated in a step F.

In step E6, after the authentication of the communicating equipment EC, the service node SGSN activates the PDP context of the communicating equipment EC, meaning that it assigns an IP address to the communicating equipment EC and opens a logic link between the communicating equipment EC and the service server SS designated by the address AdS so that they communicate with one another.

According to the invention, a transmission of billing information to an account associated with a communicating equipment EC is provided. For example, a server dedicated to payment may take into account a list of service entity identifiers associated with an identifier of the company to which the service entities of the list belong, in order to establish an overall invoice for these service entities in the name of said company.

According to a second embodiment with reference to FIG. 2, the inventive method for establishing packet communication comprises steps F1 to F7 executed automatically within the inventive communication system.

In a preliminary step F01 similar to step E01, the operator server predefines lookup tables TC which each comprise service entity identifiers IdES respectively associated with communicating equipment identifiers IdEC and which are respectively associated with addresses AdS of service servers SS, In step F1, the communicating equipment EC sends a call similar to an emergency call to the call server SA devoted to emergency calls, via the base station BTS, the base station controller BSC, and the mobile service switch MSC connected to the server SA. For example, the call sent by the communicating equipment EC corresponds to the number "113" recognized by the call server SA without using an international identity IMSI, like an emergency call whose number is "112", In step F2, the call server SA receives the call sent by the communicating equipment and interprets this call as a request to establish packet communication with a service server. For example, the call server SA holds a list of call numbers which are interpreted without use of an international identity IMSI associated with the communicating equipment that sent the call. According to the preceding example, the list is restricted to the call number "113". The call server SA transmits a confirmation request ReqC to the communicating equipment EC.

In step F3, in response to receiving the confirmation request ReqC, the communicating equipment EC transmits a confirmation response RepC to the call server SA containing a service entity identifier IdES, a communicating equipment identifier IdEC and an address AdO of the operator server SO, in a similar manner to step E3.

In step F4, the call server SA queries the operator server SO by means of the received address AdO of the operator server SO in order to authenticate the communicating equipment EC. To that end, the call server SA retransmits the service entity's identifier IdES and the communicating equipment's identifier IdEC to the operator server SO which searches for them in the lookup table TC of the database BD, as in step E4.

If the identifiers IdES and IdEC are included within a table TC, the operator server determines during step F5 the address AdS of a service server SS associated with the located table TC and sends the address AdS to the call server SA, which is then informed that the communicating equipment EC is authenticated. If the identifiers IdES and IdEC are not included within a table TC, the communicating equipment EC is not authenticated, and the method ends as indicated in a step F.

In step F6, after the authentication of the communicating equipment EC, the call server SA determines a temporary identity TMSI (Temporary Mobile Station Identity) of the communicating equipment EC. The temporary identity TMSI makes it possible to temporarily and locally identify the communicating equipment EC with the switch MSC by means of the register VLR. The call server SA transmits the temporary identity TMSI and address AdS of the service server to the communicating equipment EC.

In step F7, the communicating equipment EC connects to the service node SGSN in order to be attached to the GPRS network by transmitting the temporary identity TMSI and address AdS of the service server to the node SGSN. This node assigns an IP address to the communicating equipment EC and opened a logical link between the communicating equipment EC and the service server SS designated by the address AdS so that they can communicate with one another.

In one variant, the authentication of the communicating equipment EC is executed by means of the service entity identifier IdES only. In this situation, the communicating equipment EC transmits the service entity identifier IdES and the address AdO of the operator server SO to the service node SGSN in step E3, or to the call server SA in step F3.

According to another variant, the authentication of the communicating equipment EC is executed by means of a code above and beyond the service entity identifier IdES and the communicating equipment's identifier.

The invention claimed is:

1. A method for establishing a packet communication between a first server (S) connected to a packet network and a service entity (ES) within a radio communication network (RR), the method comprising:
   transmitting (E3-E4; F3-F4) an identifier (IdES) of the service entity (ES) from that entity to a second server (SO),
   determining (E5; F5) an address (AdS) of the first server (SS) as a function of the service entity identifier (IdES) received within the second server (SO) and transmitting (E5; F5-F7) the determined address of the first server (AdS) from the second server (SO) to a gateway (SGSN) connecting the radio communication network (RR) and the packet network (RP) and
   establishing, (E5; F7) by the gateway (SGSN), a communication between the service entity (ES) and the first server (SS) based on the determined address of the first server (AdS) and without a need for a subscriber identification module.

2. The method according to claim 1, according to which the address of the first server (AdS) is determined if the service entity's identifier (IdES) is included within a lookup table (TC) associated with the first server's address (MS).

3. The method according to claim 1, further comprising transmitting (E3-E4; F3-F4) an identifier (IdEC) of a communicating equipment (EC) from the service entity (ES) to the second server (SO), the communicating equipment being included within the service entity and capable of communicating with the radio communication network, and according to which the address of the first server (AdS) is determined if the service entity's identifier (IdES) and the communicating equipment's identifier (IdEC) are included in a lookup table (TC) associated with the address of the first server (AdS).

4. The method according to claim 1, further comprising:
   transmitting (E1) a first request from the service entity (ES) to the gateway (SGSN),
   following the receipt of the first request, a transmitting (E2) a second request from the gateway (SGSN) to the service entity (ES), and
   following the receipt of the second request, a transmitting (E3) a response containing the service entity identifier (IdES) and an address (AdO) of the second server from the service entity (ES) to the gateway (SGSN), and,
   retransmitting, by the gateway, the identifier of the service entity to the second server (SO) depending on the address of the second server (AdO).

5. The method according to claim 1, further comprising:
calling (F1) from the service entity (ES) to a call server (SA) connected to the radio communication network (RR),
in response to receiving the call, transmitting (F2) a request from the call server (SA) to the service entity (ES), and
in response to receiving the request, transmitting (F3) a response containing the service entity identifier (IdES) and an address of the second server (AdO) from the service entity (ES) to call server (SA), and,
transmitting by the call server said service entity identifier to the second server (SO) depending on the address of the second server (AdO).

6. The method according to claim 5, further comprising transmitting (F5) the determined address of the first server (AdS) from the second server (SO) to the call server (SA),
determining (F) a temporary identity (TMSI) of the service entity in the call server (SA) and
transmitting the temporary identity and the determined address of the first server (AdS) from the call server (SA) to the service entity (ES), and
transmitting (F7) the temporary identity and the determined address of the first server (AdS) from the service entity to the gateway (SGSN).

7. The method according to claim 3, wherein the identifier of the communicating equipment (IdEC) is representative of a serial number of the communicating equipment (EC).

8. A service entity (ES) for establishing packet communication between a first server (SS) connected to a packet network and the service entity (ES), the service entity comprising:
a radio interface and processing unit (UTC) for transmitting an identifier (IDES) of the service entity (ES) from the service entity to a second server (SO) in order for the second server to determine an address (ADS) of the first server (SS) based on the received identifier of the service entity (IdES) and transmit the first server's determined address (ADS) to a gateway (SGSN) which connects the radio communication network (RR) and the packet network (RP) and which establishes communication between the service entity (ES) and the first server (SS) based on the first server's determined address (ADS) and without a need for a subscriber identification module.

9. A gateway (SGSN) connecting a radio communication network (RR) and a packet network (RP) to establish packet communication between a first server (SS) connected to the packet network and a service entity (ES) within the radio communication network (RR), the gateway comprising:
a processing unit (UTP) for transmitting a request to the service entity (ES) in response to a receipt of another request transmitted from the service entity (ES), and
for receiving a response containing an identifier (IDES) of the service entity (ES), and an address (ADO) of a second server (SO) from the service entity (ES) and to retransmit the service entity identifier to the second server (SO) based on the second server's address (ADO), and
to establish a communication between the service entity (ES) and the first server (SS) based on an address of the first server (ADS) transmitted by the second server (SO) and determined by the second server depending on the service entity identifier (IDES) and without a need for a subscriber identification module.

10. A server (SO) for establishing packet communication between a first server (SS) connected to a packet network and a service entity (ES) within a radio communication network (RR), the server comprising:
a processing unit (UTO) for receiving an identifier (IDES) of the service entity (ES) from the service entity (ES), and
for determining an address (ADS) of the first server (SS) based on the received identifier of the service entity (IDES) and transmitting the determined address of the first server (ADS) to a gateway (SGSN) connecting the radio communication network (RR) and the packet network (RP), so that the gateway establishes communication between the service entity (ES) and the first server (SS) depending on the address of the determined address of the first server (AdS) and without a need for a subscriber identification module.

11. A method for establishing packet communication between a first server (SS) connected to a packet network and a service entity (ES) within a radio communication network (RR), the method comprising:
transmitting an identifier (IDES) of the service entity (ES) from the service entity to a second server;
receiving, from the second server, an address (ADS) of the first server (SS) based on the transmitted identifier of the service entity (IdES); and
transmitting the first server's determined address (ADS) to a gateway (SGSN) which connects the radio communication network (RR) and the packet network (RP) and which establishes communication between the service entity (ES) and the first server (SS) based on the first server's determined address (ADS) and without a need for a subscriber identification module.

12. A method for establishing packet communication between a first server (SS) connected to the packet network and a service entity (ES) within the radio communication network (RR), the method comprising:
receiving a first request from the service entity at a gateway;
transmitting, from the gateway a request to the service entity (ES) in response to the receipt of the first request transmitted, and
receiving a response, at the gateway, containing an identifier (IDES) of the service entity (ES), and an address (ADO) of a second server (SO) from the service entity (ES) and
retransmitting the service entity identifier, from the gateway, to the second server (SO) based on the second server's address (ADO), and
establishing the communication between the service entity (ES) and the first server (SS) based on an address of the first server (ADS) received from the second server (SO) and without a need for a subscriber identification module.

13. A method for establishing packet communication between a first server (SS) connected to a packet network and a service entity (ES) within a radio communication network (RR), the method comprising:
receiving, at a second server, an identifier (IDES) of the service entity (ES) from the service entity (ES), and
determining, by the second server, an address (ADS) of the first server (SS) based on the received identifier of the service entity (IDES); and
transmitting the determined address of the first server (ADS), from the second server to a gateway (SGSN) connecting the radio communication network (RR) and the packet network (RP), thereby providing information to allow the gateway to establish communication between the service entity (ES) and the first server (SS) depending on the determined address of the first server (AdS) and without a need for a subscriber identification module.

* * * * *

UNITED STATES PATENT AND TRADEMARK OFFICE
CERTIFICATE OF CORRECTION

| | | |
|---|---|---|
| PATENT NO. | : 8,539,084 B2 | Page 1 of 1 |
| APPLICATION NO. | : 12/867017 | |
| DATED | : September 17, 2013 | |
| INVENTOR(S) | : Soulie et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 253 days.

Signed and Sealed this
Eleventh Day of August, 2015

Michelle K. Lee
*Director of the United States Patent and Trademark Office*